INVENTOR
Robert A. Rosenblum

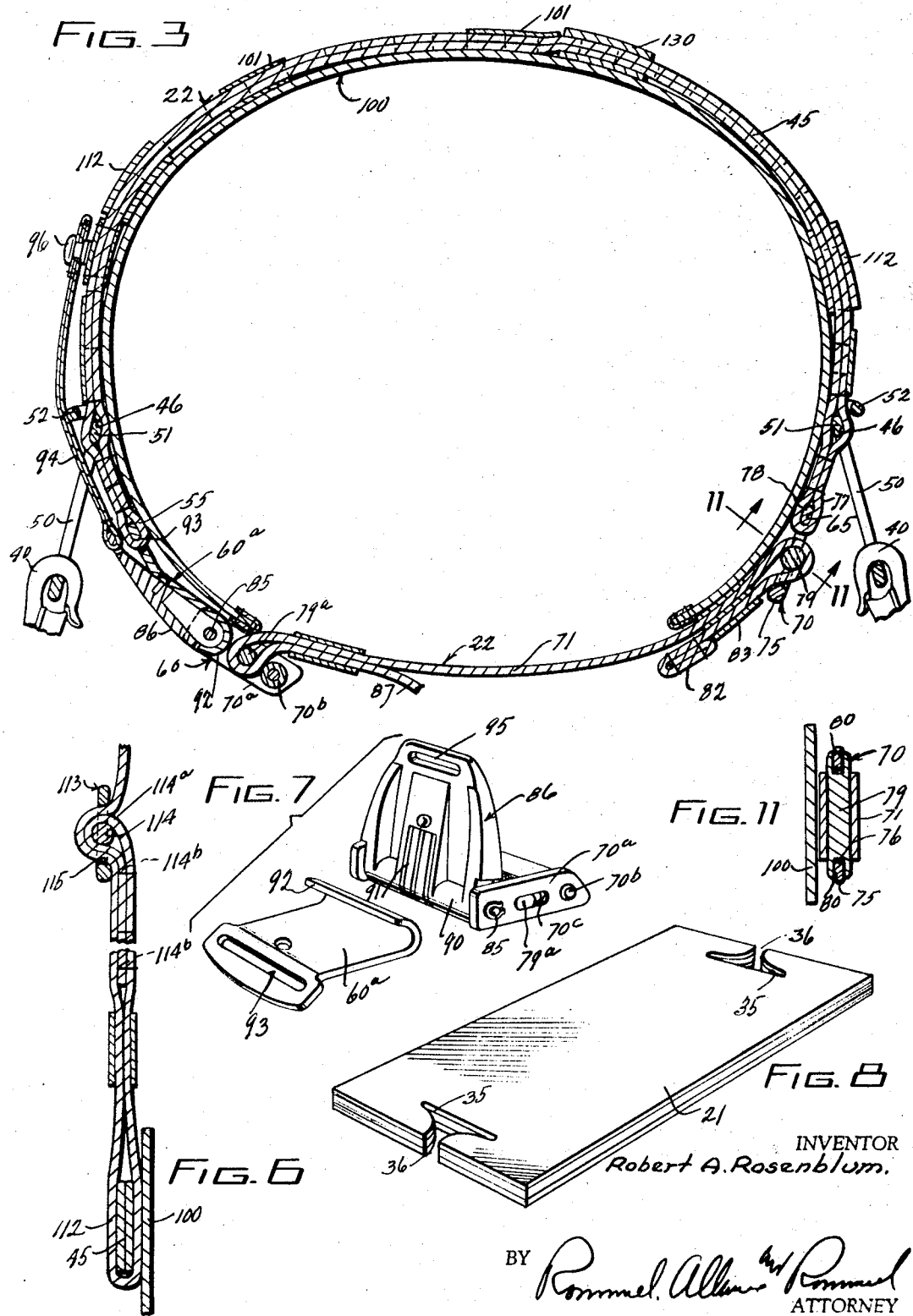

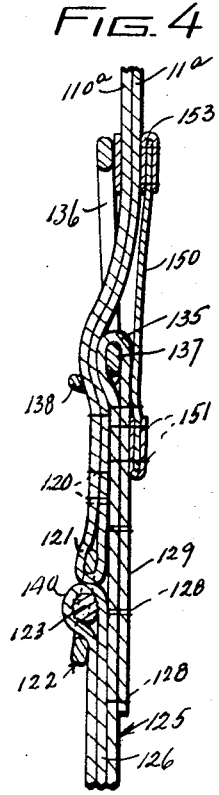
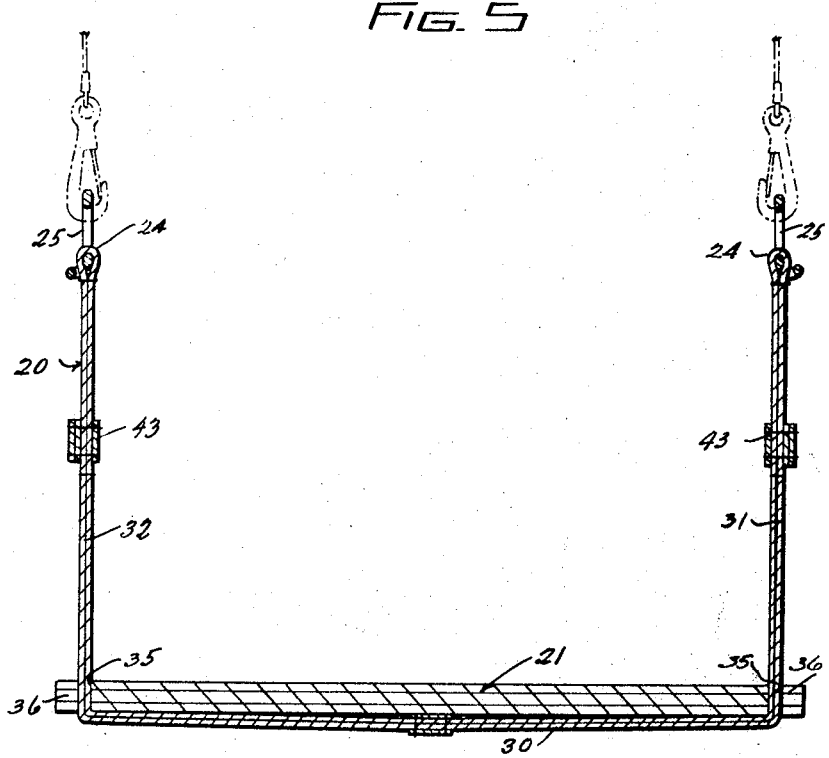
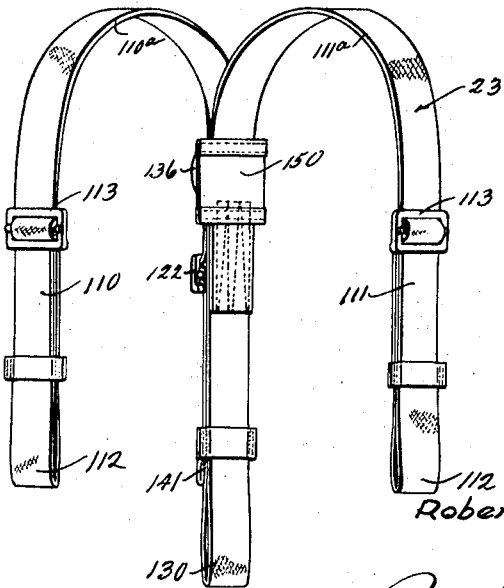
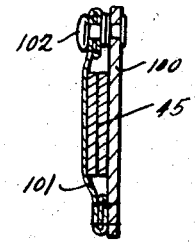

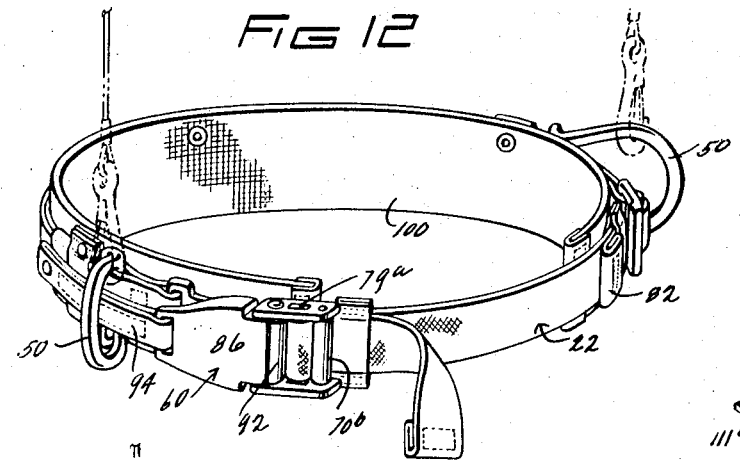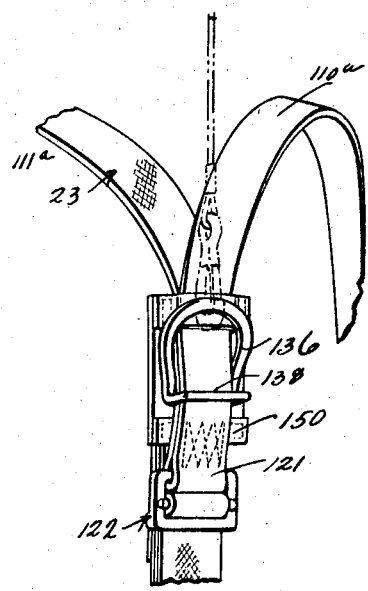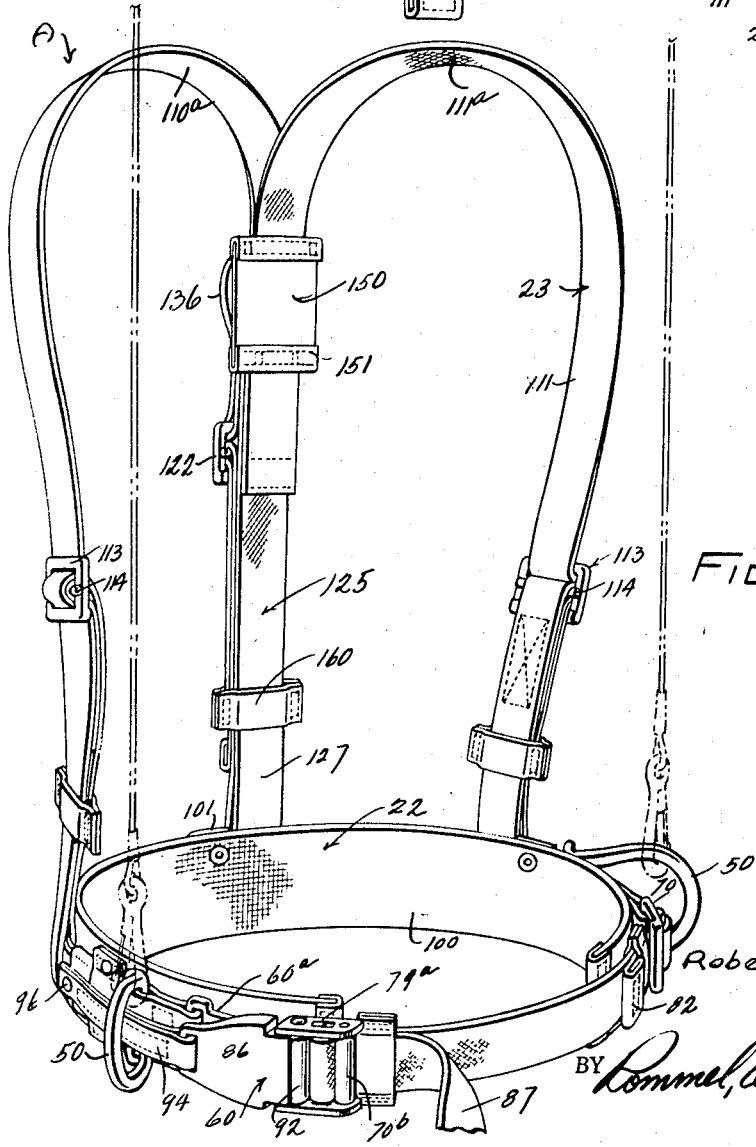

United States Patent Office 3,448,826
Patented June 10, 1969

3,448,826
INDUSTRIAL SAFETY BELT AND HARNESS
Robert A. Rosenblum, Lexington, Ky., assignor to Irving Industries Inc., a corporation of New York
Filed Jan. 23, 1967, Ser. No. 610,850
Int. Cl. A62b *1/16, 35/00;* A47l *3/04*
U.S. Cl. 182—3
10 Claims

ABSTRACT OF THE DISCLOSURE

An industrial safety belt and harness having as a basic feature a safety belt for attachment at the waist of a wearer with size adjustment and a safety lanyard attachment: a sling type webbing which can be attached as an accessory to the belt with a rigid seat detachably connected to the sling: the sling having lanyard attachments. Furthermore, the industrial safety harness includes as an accessory a size adjustable upper body harness for detachable connection with the sides and rear of the belt and having a lanyard connection at the upper part of the body harness.

---

This invention relates to an improved industrial safety belt and harness which provides a maximum amount of protection and security in such situations which require the use of a life-line or static support line or lines.

A further object of this invention is the provision of an industrial safety belt and seat sling type harness, the parts of which are relatively detachable and adjustable to suit the stature of a wearer; the same including an adjustable waist belt having a quick release buckle, means to attach a safety lanyard thereto and means for detachably connecting a sling seat and its riser webs to the belt. The improved industrial seat sling type harness may selectively include an upper body harness for use with the belt. The upper body harness includes lengthwise adjustable side and rear riser webs, shoulder webs, and means for securing a static support line at the upper portion of the rear riser web.

A further object of this invention is the provision of an industrial harness which can be readily applied by the wearer and which comfortably suports the wearer for the performance of front work; the parts being so related that the arms and legs of the wearer are free to move laterally, forwardly and backwardly.

A further object of this invention is the provision of professional safety equipment including relatively adjustable and detachably related parts such as a waist belt, and its protection pad, a seat sling, rigid seat for the sling, and upper body harness; the upper body harness and sling including size adjusting means to suit the stature of the wearer.

A further object of the invention is the provision of professional safety equipment adapted to support an individual in the performance of dangerous work which includes a plurality of relatively detachable and size adjustable parts such as a basic size adjustable safety waist belt with means for attachment of one or more safety lanyards thereto, a sling type flexible seat harness with means for selective detachable connections of the same to the belt and to a rigid seat, said sling having means for detachably connecting of one or more lanyards thereto, and an upper body harness for detachably connecting to the belt having means for attachment of a static safety line thereto.

Other objects and advantages of this invention will be apparent during the course of the following detailed description.

In the accompanying drawings forming a part of this specification, and wherein similar reference characters designate corresponding parts throughout the several views:

FIG. 3 is a cross sectional view taken through the waist belt and harness associated detail, showing the belt closed.

FIG. 4 is a vertical cross sectional view taken through a rear webbing of the upper body harness and belt, showing associated details thereof; the view being taken substantially on the line 4—4 of FIG. 2.

FIG. 5 is a cross sectional view taken through the seat sling and rigid detachable seat of the safety equipment.

FIG. 6 is a cross sectional view taken through one of the side riser webs of the upper body harness and belt, substantially on the line 6—6 of FIG. 1.

FIG. 7 is a perspective view showing details of a quick release buckle used in the safety belt of the harness.

FIG. 8 is a perspective view of a rigid type seat adapted for use upon the flexible webbing sling of the harness.

FIG. 9 is a perspective view of an accessory which may be selectively used with the belt structure of the harness, comprising an upper body harness.

FIG. 10 is a cross sectional view taken substantially on the line 10—10 of FIG. 2, showing support on the belt of a protecting pad.

FIG. 11 is a cross sectional view taken through one of the adjustment connecting members utilized at various places on the harness for the purpose of lengthwise webbing adjustment, the view being taken substantially on the line 11—11 of FIG. 3.

FIG. 12 is a perspective view of the basic safety waist belt showing how a safety lanyard or lanyards may be attached thereto.

FIG. 13 is a perspective view of the safety belt showing how an upper body harness is attached thereto, when needed, and also showing how a safety lanyard or lanyards may be attached to the belt.

FIG. 14 is a fragmentary perspective view showing how a safety static line may be attached to the upper body harness.

Figure 1:
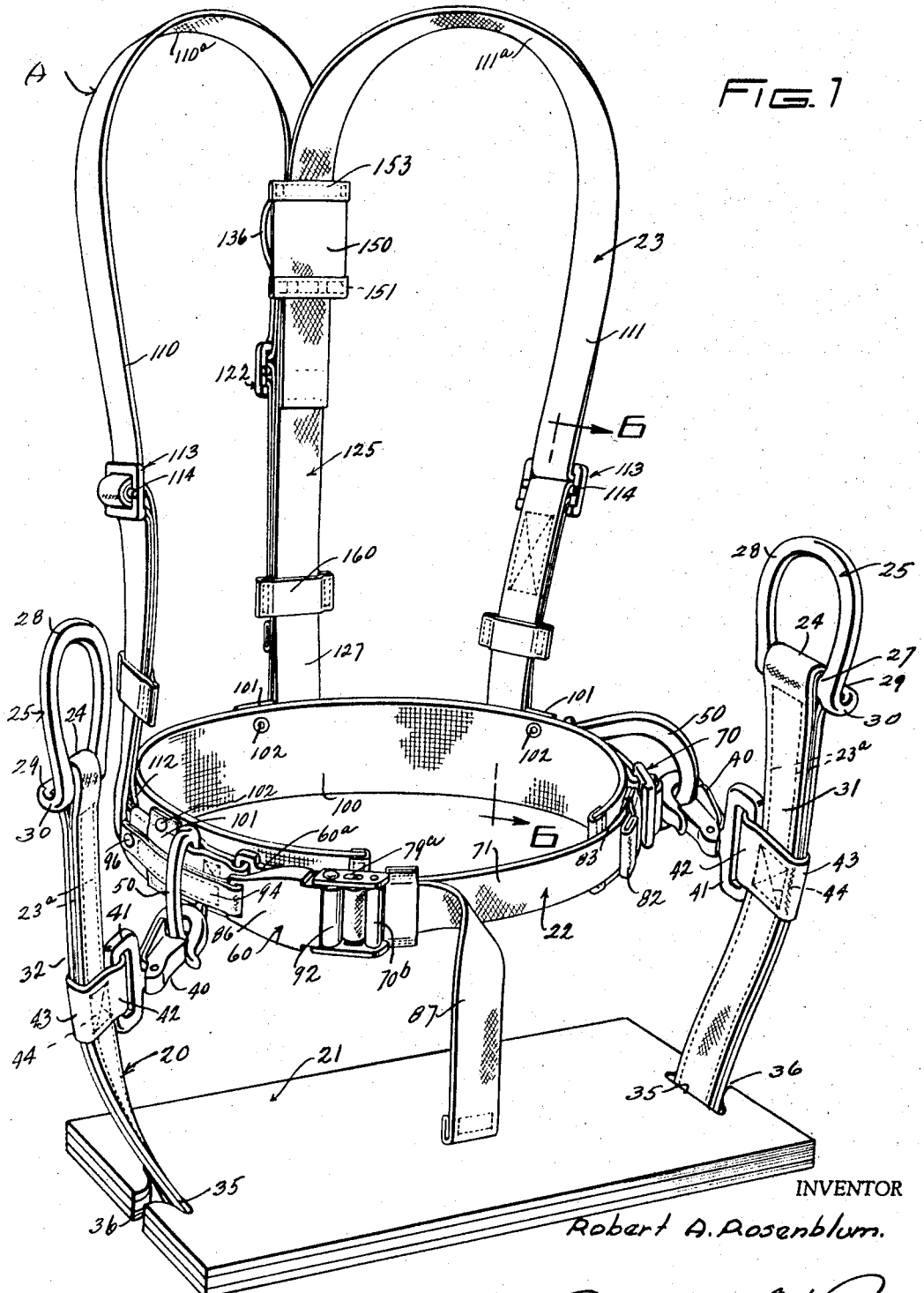
FIG. 1 is a front perspective view of the waist belt, seat sling type harness, and an upper body harness showing the various parts thereof in extended relation.

In the drawings wherein for the purpose of illustration, is shown only a preferred embodiment of the invention, the letter A may generally designate the industrial safety equipment. Broadly, it includes a basic safety waist belt 22, a flexible sling 20; rigid seat 21, and upper body shoulder type harness 23. All of these parts are relatively detachable and can be used in different combinations best suitable for particular work.

The flexible webbing portions of the harness are preferably constructed of strong, durable woven nylon.

Figure 2:
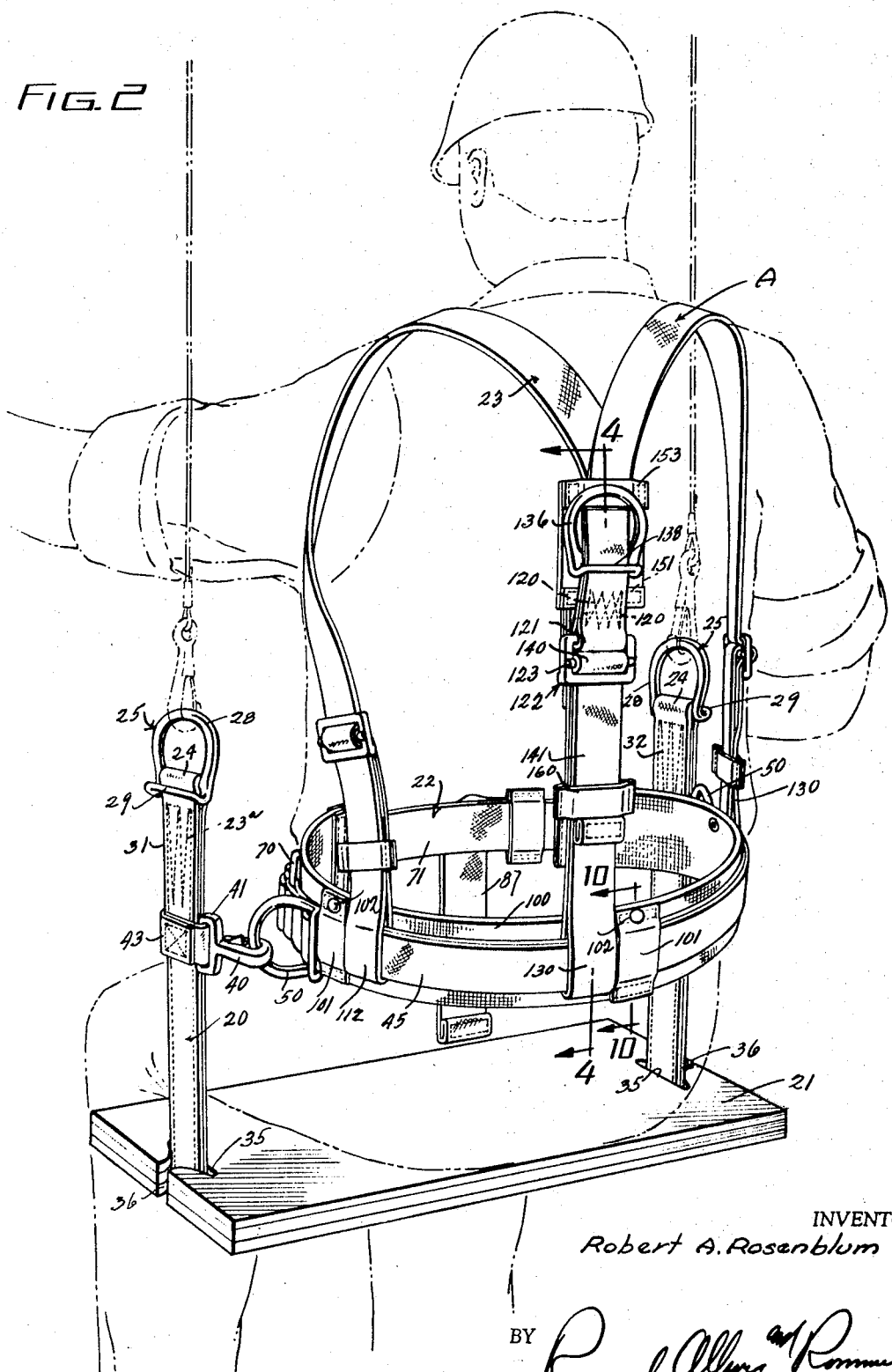
FIG. 2 is a perspective rear view of the waist belt, seat sling type harness and upper body harness showing a wearer in dot and dash lines upon whom the safety equipment parts are assembled, and illustrating the degree to which the arms and the legs of the wearer may be moved without obstruction by details of the safety equipment.

The basic waist belt 22 is principally of woven nylon, including a length 45 which is formed of rear and side portions, two-ply in thickness; the same being secured together as by stitching. This double thickness of webbing near the front ends thereof is looped to provide vertical passageways 46 adapted to receive therethrough cross bar portions 51 of rings 50. The rings 50, each include a cross bar portion 52 which limits the rear movement of the ring and always holds it in a position to extend slightly forward, as shown in FIGS. 1, 2 and 3. The right end of the belt portion 45 is extended forwardly at the side in double ply and terminates in a loop 55, the passageway of which is adapted to receive a buckle part 60ª of a quick release coupling 60, to be subsequently described.

The portion 45 at the left side extends forwardly and at its terminal is provided with a loop 77, the opening 65 of which is adapted to receive a cross bar of an adjustment connector 70.

The girth size of the belt 22 is determined by a front belt web 71, the ends of which are attached to adjustment connectors 70 and 70a of the general type shown in U.S. Patent 2,130,547. These connectors serve the purpose of adjustably connecting a web to another web so that one web can be moved in one direction only and which web when moved in the other direction will lock on the connector and prevent relative adjustment of the webs. To that end the connector 70 shown in FIG. 11 comprises a rectangular shaped ring portion 75 having an opening 76 therein. The belt web loop 77 engages about the bar 78 of the ring 75, as shown in FIG. 3. In the opening 76 of the ring 75 is located a lock bar 79 which has divided ends providing recesses 80 which slidably receive the side bars of the ring 75. With this form of connector the end of the front portion 71 of the belt is looped around the lock bar 79 and extended through the opening of the ring 75. The free end 82 of belt 71 is slidably extended through a flexible retainer 83. Pulling on the belt end 82 will enable the belt to be adjusted, whereas pulling on the body portion 71 will lock the bar 79 and prevent adjustment of the belt. The opposite end of the front belt portion 71 is likewise looped around a lock bar 79a of a connector 70a; the latter connector 70a having the same general characteristics as the connector 70 above described. The connector 70a is pivoted to a cross bar 85 of a coupling part 86 forming a portion of the quick release buckle 60. The right end 87 of the belt portion 71 can be pulled for adjustment of belt size, and if the main body portion of the belt part 71 is pulled it will lock the bar 79a and web against the ring bar 70b. The lock bar 79a slides in slots 70c on the side bar portions on the adjustment connector 70a as shown in FIG. 11.

Referring to the quick release buckle 60, the same includes the part 86 pivoted at a barrel portion 90 on the pin 85. Both parts of the buckle 60a and 86 are of metal and have metal to metal contact. Part 86 is provided with a permanent magnet 91. The mode of attachment of the buckle parts 60a and 86 is such that the hooked end 92 of the buckle part 60a engages around the barrel 90 of the buckle part 86 and the permanent magnet 91 attracts the body portion of the buckle part 60a and holds it in position to prevent separation of the buckle parts 60a and 86. It is to be noted that the buckle part 60a is provided with a slot 93 through which the looped end 55 of the belt portion 45 extends, as shown in FIG. 3.

As a safeguard to prevent accidental opening of the buckle parts 60a and 86 there is provided a flexible tab 94 looped through the opening 95 of the buckle part 86. This tab 94 extends in the direction opposite to the connecting point of the buckle parts. At its free end it is provided with a lift-the-dot fastener 96, the male portion of which is connected at the right side of the belt portion 45, as shown in FIG. 3.

It is to be noted that the release buckle 60 is located at the right side of the belt and not in the center front of the wearer, and thus it is in an out of the way position.

The belt 22 is furthermore provided with a protecting pad 100 which is of a soft woven nylon. It is wider in vertical height than the belt webbing 45. This pad 100 is of a length to extend at the inner side of the belt from the adjustment connector 70 rearwardly and around to the quick release buckle 60. It protects the body of the wearer, not only from the woven belt, but also from the hardware attached therewith. The mode of attachment of the pad 100 is best shown in FIG. 2 and consists of three tabs 101 which at their lower ends are stitched to the pad 100, and at the upper ends are provided with lift-the-dot fasteners 102 located above the belt webbing 45, so that the pad is held in proper position.

The sling seat 20 primarily intended as a construction worker's sling preferably comprises a double thickness of webbing stitched together lengthwise at 23a. The upper ends thereof provide looped portions 24 adapted to support metal attachment rings 25, each of which consists of a straight cross bar 27, and a segmental ring shaped portion 18. The connecting rings 25 are provided with a stirrup shaped portion 29 with right angled sides 30 attached to the ring portion 28. The rings 25 are located at opposite sides of the sling webbing, and the portions 29 limit the extent to which the rings can drop at the outer sides of the sling. Normally the ring 25 is upstanding when the sling is on a wearer, and it cannot move appreciably to the outer side of the sling riser web. The sling as shown in FIG. 5 comprises a double web flexible sling seat 30 and right and left double web risers 31 and 32; the latter having top loops 24 thereon for securement of the connector rings 25 thereto.

The wearer of the harness may sit directly in the flexible portion of the seat sling 20, as in a bosun's chair, and this use is also suitable for tree trimmers. A rigid seat 21 may be provided for comfort purposes, having transverse slots 35 at the ends, paralleling the end margins of the seat 21, with narrow entrance passageways 36 through which the webbing 20 may be slipped to readily mount the rigid seat 21 on the sling seat 30.

The riser webs 32 of the flexible sling 20 are provided intermediate their ends with snap fasteners 40 which have sling portions 41 thereon secured to loops 42 of laterally extending webbing sections 43 which are stitched at 44 to each of the riser webs 31 and 32. The snap fasteners 40 extend from the rear margins of the riser webs 31 and 32 and are adapted for attachment to connector rings 50 attached to the waist belt structure 22, as will subsequently be described.

Referring to the upper body harness 23, the same is provided to distribute stress in case of a fall and thus becomes an upper trunk safety harness. It includes side riser web portions 110 and 111, the lower ends of which are detachably looped at 112 around the belt portion 45. The looping of the lower ends of the web portions 110 and 111 contemplate the provision of an adjustment connector 113 for each. The lock bar portions 114 of the connectors 113 are secured by looping the extreme ends 114a of the webbing thereto. The loops 114a are fixed by stitching 114b. The outer ply of the riser web extends through the opening 115 of the connector 113 and looped around the lock bar 114 and loop 114a. The lengthwise adjustment of the front side webs 110 and 111 is the same as above described for the connector 70.

The side riser webs 110 and 111 are extended upwardly and respectively provide shoulder webs 110a and 111a. The latter extend downwardly at the back of the wearer and are stitched together at 120, as shown in FIG. 2, providing a loop 121 which extends about a bar of the ring 122 of an adjustment connector having a lock bar 123 thereon and functioning the same as the connector 70 above described. The remainder of the rear riser web 125 of the upper body harness 23 consists of a web portion 126, shown in FIG. 4 which is looped around the lock 123 at 140, extends downwardly and is looped at 130 around the belt portion 45. The upwardly extending web portion 127 shown in FIG. 4 extends upwardly and is stitched looped at 128 to the return end 129, forming at the upper end thereof a loop 135 to which a lift point lanyard or static line connecting ring 136 is secured on a cross bar portion 137; the ring lying entirely to the rear of web 125 and having a cross bar 138 which limits the downward movement of the ring so that it is always in upwardly extended relation. The shoulder webs 110a and 111a are overlapped above the ring 136 and extended downwardly to provide the loop 121 above described which is attached to the bar of the adjustment connector 122. The portion 126 is looped at 140 around the lock bar 123 and has an end 141 which extends downwardly to effect lengthwise adjustment of the riser web 125.

A protector pad 150 is stitched at 151 to the looped end of the web 129, adjacent to the ring 136 and extends upwardly and has a slidable pocket connection at its upper end 153 through which the webs 110ª and 111ª extend for adjustment. This pad 150 protects the back of the wearer from the lanyard and connecting ring 136.

A retaining band 160 slidably receives the adjustment strap 141 of the rear riser strap as shown in FIG. 4.

From FIG. 2 it will be obvious how the wearer is able to move around insofar as his arms and legs are concerned, unobstructed from the front. The seat riser webs 31 and 32 are positioned in spaced relation at the sides of the wearer by the connectors 40 and 41 which when attached to the rings 50 on the belt 22 holds the static lines 160 and 161 connecting the rings 25 spaced from the wearer. The wearer may slide on the seat or sling for some degree of sidewise movement.

Various changes in the shape, size and arrangement of parts may be made to the form of invention herein shown and described without departing from the scope of the invention as defined in the claims.

I claim:

1. In an industrial seat sling harness the combination of a flexible webbing sling in which the wearer sits as in a swing, including a flexible seat portion and side riser flexible web portions which are adapted to extend upwardly from the seat portion to above the normal waist of the wearer, the upper ends of the said side portions having static supporting line connectors attached thereto, a waist belt having a quick release buckle connecting ends thereof, and connectors mounted intermediate the ends of the side riser portions of the sling for relative attachment with the belt sides so as to space the riser portions of the sling from the belt sides.

2. The industrial seat sling harness as described in claim 1 in which an upper body attaching harness is provided including side and rear riser webs releasably connected at their lower ends to the sides and rear of the belt, said side and rear riser webs of the upper body harness having shoulder webs connecting the side riser webs to the rear web.

3. The harness as described in claim 2 in which the points of connection of the side riser webs of the upper body harness are attached to the sides of the belt rearwardly of the points of connection of the sling riser webs to the belt.

4. The harness as described in claim 2 in which a rearwardly positioned static support line connector is attached to the upper body harness at the location of connection of the shoulder webs with the rear webs of the upper body harness spaced appreciably above the belt.

5. The harness as described in claim 2 in which adjustment means is provided to vary the girth of the belt and the lengths of the side and rear riser webs of the upper body attaching harness.

6. The harness of claim 1 in which a rigid seat is detachably connected at its ends to the ends of the flexible seat portion of the sling so as to lie above the flexible seat portion of the sling and hold said flexible side riser portions in spaced relation at appreciable distances from the sides of the belt.

7. The harness of claim 1 in which the connectors mounted intermediate the ends of the side riser portions of the sling comprises a snap fastener fixedly attached to each of the sling side riser portions in rear extension from the rear margins of the said side riser portions of the sling, and a ring for each of the snap fasteners connected to each of the outer sides of the belt extending laterally and forwardly and having means to hold the same in such position against rearwardly extension from the belt.

8. The harness as described in claim 1 in which a quick release buckle belt is located to one side of the front portion of the belt and comprises a pair of metal quick connectable and quickly releasable sections, one of said buckle sections having means to adjustably connect the same to an end of the belt portion for girth adjustment of the belt, and the other buckle section having means to adjustably connect it to the other end of the belt; and also having a hooked shaped portion to releasably engage the other buckle section, and magnetic means to hold said buckle sections in releasably connected relation until manually opened.

9. In an industrial safety belt and harness the combination of a belt having releasable buckle means attached thereto, an upper flexible body harness comprising right and left side riser webs and a rear central riser web, each of side and central riser webs having a belt attaching loop at its lower end adapted for releasable attachment to the belt, said upper flexible body harness having shoulder webs connecting the upper ends of the side riser webs and joined together at the central riser web, means provided on each of the side riser webs to selectively lengthen and shorten them, the rear central riser web being adapted to be disposed at the rear medial line of the body of a wearer, the shoulder webs at the juncture with the rear riser web having a rearwardly mounted and upwardly extending static line connecting member.

10. In an industrial seat sling harness the combination of a flexible webbing sling in which the wearer sits as in a swing, including a flexible seat portion and side riser flexible web portions which are adapted to extend upwardly from the seat portion to above the normal waist of a wearer, the upper ends of the said side portions having static supporting line connectors attached thereto, a waist belt having front ends and a quick release buckle connecting said ends, an upper body attaching harness comprising side and rear riser webs releasably connected at their lower ends to the sides and rear of the belt, said side and rear riser webs of the upper body harness having shoulder webs connecting the side riser webs at their upper ends to the rear web, said side riser webs having means to individually adjust the lengths thereof, laterally extended connectors mounted intermediate the ends of the side riser portions of the sling each comprising a snap fastener fixedly attached to the sling side riser portions and a laterally extensible ring for each of the snap fasteners connected to each of the outer sides of the belt detachable connection to the adjacent snap fasteners.

References Cited

UNITED STATES PATENTS

| | | | |
|---|---|---|---|
| 910,006 | 1/1909 | Lowy | 182—7 |
| 1,369,456 | 2/1921 | Meredith | 297—389 |
| 2,070,580 | 2/1937 | Cochran | 182—7 |
| 2,137,564 | 11/1938 | Carlson | 182—3 |
| 2,254,179 | 8/1941 | Hoyt | 182—7 |
| 2,699,284 | 1/1955 | Rose | 182—3 |
| 2,877,833 | 3/1959 | Boles | 182—3 |
| 3,022,855 | 2/1962 | Lewis | 182—3 |
| 3,301,594 | 1/1967 | Pukish | 182—3 |
| 3,321,247 | 5/1967 | Dillender | 182—3 |
| 1,877,704 | 9/1932 | Switlik | 182—3 |
| 2,647,293 | 8/1953 | Wintercorn | 182—4 |

FOREIGN PATENTS

| | | |
|---|---|---|
| 72,350 | 3/1951 | Denmark. |
| 1,100,428 | 4/1955 | France. |

REINALDO P. MACHADO, *Primary Examiner.*